(12) United States Patent
Fellahi

(10) Patent No.: US 9,120,921 B2
(45) Date of Patent: Sep. 1, 2015

(54) POLYETHYLENE COMPOSITIONS COMPRISING POLYPROPYLENE

(71) Applicant: Saudi Basic Industries Corporation, Riyadh (SA)

(72) Inventor: Said Fellahi, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/054,044

(22) Filed: Oct. 15, 2013

(65) Prior Publication Data

US 2014/0107270 A1 Apr. 17, 2014

(30) Foreign Application Priority Data

Oct. 15, 2012 (EP) ................................. 12007130

(51) Int. Cl.
| | |
|---|---|
| C08L 23/06 | (2006.01) |
| C08L 23/08 | (2006.01) |
| C08L 23/12 | (2006.01) |
| B29C 45/00 | (2006.01) |
| C08L 23/10 | (2006.01) |

(52) U.S. Cl.
CPC .............. *C08L 23/12* (2013.01); *B29C 45/00* (2013.01); *C08L 23/06* (2013.01); *C08L 23/10* (2013.01)

(58) Field of Classification Search
CPC ......... C08L 23/06; C08L 23/00; C08L 23/12; C08L 23/10; C29C 45/00
USPC ................. 525/191, 240; 524/291; 264/328.1
See application file for complete search history.

(56) References Cited

U.S. PATENT DOCUMENTS

| | | | |
|---|---|---|---|
| 4,463,113 A | 7/1984 | Nakahara et al. | |
| 5,049,605 A | 9/1991 | Rekers | |
| 5,342,868 A | 8/1994 | Kimura et al. | |
| 6,465,551 B1 | 10/2002 | Zhao et al. | |
| 6,534,574 B1 | 3/2003 | Zhao et al. | |
| 7,579,387 B2 * | 8/2009 | Jackson et al. | ................ 522/112 |
| 2007/0066733 A1 * | 3/2007 | Hanssen et al. | ................ 524/394 |

FOREIGN PATENT DOCUMENTS

| | | |
|---|---|---|
| EP | 0940431 A1 | 9/1999 |
| EP | 1924642 B1 | 8/2011 |
| WO | 2004072168 A2 | 8/2004 |
| WO | 2005006387 A2 | 1/2005 |
| WO | 2008136849 A1 | 11/2008 |

OTHER PUBLICATIONS

Extended European Search Report; European Application No. 12007130.3; Date of Mailing: Mar. 4, 2013; 5 Pages.
Peacock et al.; "Handbook of Polyethylene: Structures, Properties, and Application"; Chapter 3: Production Processes; 2000; pp. 41-66.
Zimm et al.; "The Dimensions of Chain Molecules Containing Branches and Rings"; The Journal of Chemical Physics; vol. 17, No. 12; Dec. 1949; pp. 1301-1314.

* cited by examiner

*Primary Examiner* — Nathan M Nutter
(74) *Attorney, Agent, or Firm* — Cantor Colburn LLP

(57) ABSTRACT

A composition can comprise: linear low density polyethylene having a melt mass flow rate as determined using ASTM D-1238 (190° C./2.16 kg) in the range from 4 to 125 g/10 min or high density polyethylene having a melt mass flow rate as determined using ASTM D-1238 (190° C./2.16 kg) in the range from 4 to 125 g/10 min and polypropylene, wherein the amount of polypropylene is from 0.005 to 10 wt % based on the total weight of the linear low density polyethylene or the high density polyethylene and the polypropylene, wherein the polypropylene has a melt temperature ($T_m$) from 140° C. to 200° C. and/or a crystallization temperature ($T_c$) from 100° C. to 140° C., wherein the $T_m$ and $T_c$ are determined using Differential Scanning Calorimetry according to ASTM D 3418-08 using a scan rate of 10° C./min on a sample of 10 mg and using the second heating cycle. The invention also relates to the use of the composition in injection molding.

14 Claims, No Drawings

POLYETHYLENE COMPOSITIONS COMPRISING POLYPROPYLENE

CROSS REFERENCE TO RELATED APPLICATIONS

The present application claims priority to European Application Serial No. 12007130.3, filed Oct. 15, 2012, whose contents are incorporated herein in their entirety by reference.

The invention relates to a composition comprising linear low density polyethylene or high density polyethylene and polypropylene. The invention also relates to the use of said composition in (thin wall) injection molding and to a process using said composition.

A commercially attractive way of producing injection molded articles is thin wall injection molding (TWIM). In thin wall injection molding, articles can be produced at high speed, since the cycle times can be shorter due to fast cooling of the thin walls. Furthermore, thin wall injection molding reduces the carbon footprint and with that a more sustainable way of producing molded articles is achieved, since less material needs to be injection molded and less energy is needed for the injection molding process.

The materials used for injection molding preferably have good optical properties (transparency, haze and/or clarity).

To this end, nucleating and/or clarifying agents are added to thermoplastic polymers to enable crystals to grow on the nucleating sites provided by the nucleating and/or clarifying agents.

For example, EP1924642B1 also discloses the use of nucleating agents in polyethylene compositions.

In particular, EP1924642B1 describes compositions comprising:
(a) a polyethylene selected from the group consisting of linear low density polyethylene, medium density polyethylene, high density polyethylene, and combinations thereof; and
(b) a nucleated polyolefin, said nucleated polyolefin comprising a polyolefin other than polyethylene and a nucleating or clarifying agent, said nucleating or clarifying agent being selected from the group consisting of benzoic acid salts, substituted benzoic acid salts, dicarboxylate metal salts, hexahydrophthalic acid metal salts, phosphate ester salts, glycerolate salts, di-, tri-, and tetra-amides, pine rosin derivatives, 2,6-naphthalene dicarboxamides and polyvinylcyclohexane, wherein said nucleated polyolefin is present in the composition in an amount of 1,000 to 100,000 ppm based on the total weight of the composition.

It is an object of the invention to provide a composition based on linear low density polyethylene or high density polyethylene that is suitable for injection molding, and in particular for thin wall injection molding which has a good clarity.

This object is achieved by a composition comprising linear low density polyethylene having a melt mass flow rate as determined using ASTM D-1238 (190° C./2.16 kg) in the range from 4 to 125 g/10 min, or high density polyethylene having a melt mass flow rate as determined using ASTM D-1238 (190° C./2.16 kg) in the range from 4 to 125 g/10 min and polypropylene, wherein the amount of polypropylene is from 0.005 to 10 wt % based on the total weight of the linear low density polyethylene or the high density polyethylene and the polypropylene, wherein the polypropylene has a melt temperature ($T_m$) of from about 140° C. to about 200° C. and/or a crystallization temperature ($T_c$) from about 100° C. to about 140° C., wherein the $T_m$ and $T_c$ are determined using Differential Scanning Calorimetry according to ASTM D 3418-08 using a scan rate of 10° C./min on a sample of 10 mg and using the second heating cycle.

It has been found that when using a polypropylene having a melt temperature ($T_m$) of from about 140° C. to about 200° C. or a crystallization temperature ($T_c$) from about 100° C. to about 140° C., wherein the $T_m$ and $T_c$ are determined using Differential Scanning Calorimetry according to ASTM D 3418-08 using a scan rate of 10° C./min on a sample of 10 mg and using the second heating cycle, the LLDPE, or HDPE composition provides good optical properties, in particular a high clarity. Furthermore, as compared to injection molding grades based on polypropylene, the composition of the invention provides sufficient strength, but is less brittle at low temperatures of for example around 0° C. Therefore, for some applications, the polyethylene compositions of the invention may provide a suitable replacement of polypropylene injection molding grades.

This is surprising in view of EP1924642B1, wherein it is taught that for enhanced clarity of a polyethylene composition, a nucleating agent or clarifying selected from the group of benzoic acid salts, substituted benzoic acid salts, dicarboxylate metal salts, hexahydrophthalic acid metal salts, phosphate ester salts, glycerolate salts, diamides, triamides, tetramides, pine rosin derivatives, 2,6-naphthalene dicarboxamides and polyvinylcyclohexanes needs to be present next to a polyolefin.

It has been found that by using a polypropylene having a melt temperature ($T_m$) of from about 140° C. to about 200° C. and/or a crystallization temperature ($T_c$) from about 100° C. to about 140° C., wherein the $T_m$ and $T_c$ are determined using Differential Scanning Calorimetry according to ASTM D 3418-08 using a scan rate of 10° C./min on a sample of 10 mg and using the second heating cycle, it is no longer necessary to incorporate such nucleating agent into a polyethylene composition for a good clarity. Without wishing to be bound by theory, it is thought that the polyolefin acts as a nucleating agent even without the presence of a second nucleating agent.

Preferably therefore, the composition comprises less than 1500 ppm (parts per million as weight based on the total composition), for example less than 1000 ppm, more preferably less than 1000 ppm, for example less than 500 ppm, for example less than 300 ppm, for example less than 100 ppm, for example less than 10 ppm, for example less than 1 ppm, for example less than 0.1 ppm, for example less than 0.05 ppm, for example less than 0.01 ppm of a nucleating or clarifying agent, preferably of nucleating or clarifying agents chosen from the group of benzoic acid salts, substituted benzoic acid salts, dicarboxylate metal salts, hexahydrophthalic acid metal salts, phosphate ester salts, glycerolate salts, diamides, triamides, tetramides, pine rosin derivatives, 2,6-nephthalene dicarboxamides, polyvinylcyclohexanes, talc, pigments and combinations thereof. more preferably the composition does not substantially comprise any nucleating or clarifying agent selected from the group of benzoic acid salts, substituted benzoic acid salts, dicarboxylate metal salts, hexahydrophthalic acid metal salts, phosphate ester salts, glycerolate salts, diamides, triamides, tetramides, pine rosin derivatives, di-acetal derivatives, 2,6-naphthalene dicarboxamides, polyvinylcyclohexanes and mixtures thereof.

Examples of benzoic acid salts suitable for use as the nucleating and/or clarifying agent include, but are not limited to sodium benzoate, lithium benzoate, aluminum para-tertiary butyl benzoate, and combinations thereof.

For purpose of the invention with nucleating agent or clarifying agent is meant any material that effectively accelerates the phase change from liquid polymer to semi-crystalline polymer (evident via faster crystallization rates measured with a differential scanning calorimeter or small crystallites observed with an optical microscope).

Examples of nucleating agents are 2,6-naphthalene dicarboxamides, aliphatic mono- and di-carboxylate salts such as calcium pimelate and calcium suberate; and polyvinylcyclohexane.

Phosphate esters suitable for use as the nucleating and/or clarifying agent include, but are not limited to, sodium 2,2'-methylene-bis-(4,6-di-tert-butylphenyl)phosphate (from Asahi Denka Kogyo K.K., known as "NA-11™"), aluminum hydroxy bis[2,2'-methylene-bis-(4,6-di-tert-butylphenyl) phosphate] (from Asahi Denka Kogyo K.K., known as "NA-21™"), and other such phosphate esters as disclosed for example in U.S. Pat. Nos. 5,342,868 and 4,463,113.

Bicyclic dicarboxylate metal salts suitable for use as the nucleating and/or clarifying agent include, but are not limited to, those salts described in U.S. Pat. Nos. 6,465,551 and 6,534,574. The bicyclic salts having the structure shown below:

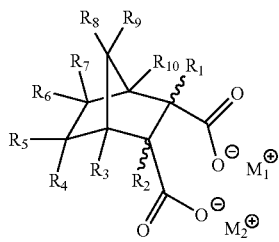

wherein $M_1$ and $M_2$ are independently selected from the group consisting of: sodium, calcium, strontium, lithium, zinc, magnesium, and monobasic aluminum; wherein $R_1$, $R_2$, $R_3$, $R_4$, $R_5$, $R_6$, $R_7$, $R_8$, $R_9$, and $R_{10}$ are independently selected from the group consisting of: hydrogen and $C_1$-$C_9$ alkyls; and further wherein any two adjacently positioned $R_3$-$R_{10}$ alkyl groups optionally may be combined to form a carbocyclic ring. In particular, suitable bicyclic dicarboxylate metal salts include disodium bicyclo[2.2.1]heptane-2,3-dicarboxylate, calcium bicyclo[2.2.1]heptane-2,3-dicarboxylate, and combinations thereof. One may employ HYPERFORM® HPN-68 or HPN-68L from Milliken & Company of Spartanburg, S.C. HPN-68L is commercially sold, and comprises the disodium bicyclo[2.2.1]heptane-2,3-dicarboxylate, as shown below:

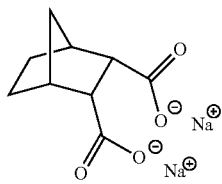 [SMILES: O=C([O-])C1C2CCC(C2)C1C(=O)[O-] ; [Na+] ; [Na+]]

Metal salts of hexahydrophthalic acid (HHPA) are known to the person skilled in the art. Such compounds may be as shown:

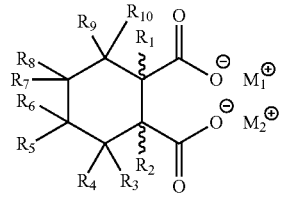

wherein $M_1$ and $M_2$ are the same or different, and may be combined into one cation, and are selected from at least one metal cation of calcium, strontium, lithium, and monobasic aluminum; and wherein $R_1$, $R_2$, $R_3$, $R_4$, $R_5$, $R_6$, $R_7$, $R_8$, $R_9$, and $R_{10}$ are either the same or different and are individually selected from the group consisting of hydrogen, $C_1$-$C_9$ alkyl, hydroxy, $C_1$-$C_9$ alkoxy, $C_1$-$C_9$ alkyleneoxy, amine, and $C_1$-$C_9$ alkylamine, halogens, and phenyl. In one preferred embodiment, the $M_1$ and $M_2$ are combined as a calcium ion. Ca HHPA as referred to herein refers to the following compound:

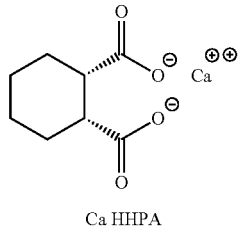

Ca HHPA

Di-acetal derivatives, which may be used as nucleating and/or clarifying agent include, but are not limited to, alditol acetals, such as the sorbitol di-acetals described in U.S. Pat. No. 5,049,605. Suitable di-acetal derivatives preferably conform to the formula

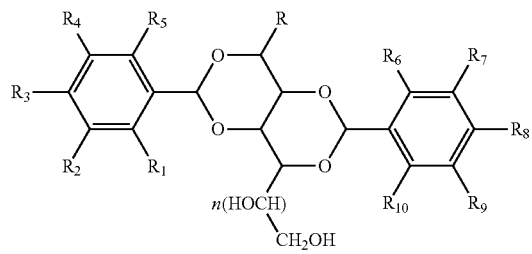

In formula (I), n typically is a value selected from 0, 1, or 2. R typically is selected from the group consisting of hydrogen, alkenyl (such as allyl), alkyl, alkoxy, hydroxylalkyl, alkylhalide, aromatic and substituted aromatic groups. $R_1$, $R_2$, $R_3$, $R_4$, $R_5$, $R_6$, $R_7$, $R_8$, $R_9$, and $R_{10}$ typically are independently selected from the group consisting of hydrogen, fluorocarbons, alkenyl, alkyl, alkynyl, alkoxy, carboxy, halides, amino, thioether and aromatic groups. In certain embodiments, any two adjacent groups selected from $R_1$, $R_2$, $R_3$, $R_4$, $R_5$, $R_6$, $R_7$, $R_8$, $R_9$, and $R_{10}$ may be combined to form a cyclic group selected from the group consisting of methylenedioxy, cyclopentyl, cyclohexyl, or other similar cyclic groups. In certain embodiments, the nucleating or clarifying agent preferably is 1,3:2,4-bis(3,4-dimethylbenzylidene) sorbitol (hereinafter DMDBS), available from Milliken Chemical under the trade name Millad® 3988.

Di-, tri-, and tetra-amides suitable for use as the nucleating and/or clarifying agent include, but are not limited to: di- and tri-amides containing amide cores comprised of either single and fused 4,5,6,7-membered aromatic or cycloaliphatic rings; di- and tri-amides containing amide cores comprised of di and tri aliphatic carboxylic acids or di and tri aliphatic amines; and tri- and tetra-amides containing amide cores comprised of aliphatic tri- and tetracarboxylic acids and aliphatic or cycloaliphatic amines. These compounds are exemplified in patent publications, including WO 2004072168, EP 0940431, and WO 200506387.

Moreover, due to the presence of the polypropylene in the linear low density polyethylene (LLDPE), or high density polyethylene (HDPE), compositions of the invention may also provide an improved heat stability (as for example shown by an increase in heat distortion temperature and/or an increase in softening point) and hence a reduced cycle time when used in injection molding, an increased stiffness, an increased crystallization temperature, a decreased crystallinity and/or improved mechanical properties, for example an increased tensile and/or flexural secant modulus, an increase in stress at yield, a decrease in the strain at yield, an increase in the stress at break increase and/or a decrease in the strain at break.

The linear low-density polyethylene (LLDPE) in the composition according to the present invention is a substantially linear copolymer having short branches, namely comprising ethylene and a C4-C10 alpha-olefin co-monomer or a mixture (of at least two C4-C10 alpha olefin comonomers) thereof. The LLDPE may be an ethylene C5-C10 alpha olefin copolymer. Preferred alpha-olefin co-monomers include 1-butene, 1-pentene, 1-hexene, 1-heptene and 1-octene, known under IUPAC as but-1-ene, pent-1-ene, hex-1-ene, hept-1-ene and oct-1-ene respectively. More preferably, the alpha-olefin comonomer is 1-butene, 1-hexene and 1-octene.

The alpha-olefin co-monomer may be present in the LLDPE in an amount of about 1 to about 20 wt % based on the ethylene-alpha olefin copolymer, preferably in an amount of from about 3 to about 15 wt %. Any type of LLDPE known in the art, for example an LLDPE having a melt mass flow rate (also known as melt flow index) as determined using ASTM D1238-10 (190° C./2.16 kg) which ranges from 4 to 125 g/10 min and a density in the range from 900 kg/m$^3$ to less than 940 kg/m$^3$ as determined using ASTM D1505-10 may be used. For example, the density of the linear low density polyethylene ranges from about 915 kg/m$^3$ to less than 940 kg/m$^3$.

As used herein, low density polyethylene (LDPE) has a density in the range from about 910 to about 940 kg/m$^3$. Any type of LDPE known in the art, for example an LDPE having a melt mass flow rate as determined using ASTM D1238-10 (190° C./2.16 kg) which ranges from 4 to 125 g/10 min may be used.

LLDPE, LDPE and HDPE may be produced by employing any method known in the art. The production processes for LLDPE, LDPE and HDPE are summarized in Handbook of Polyethylene by A. Peacock, Dekker ed., ISBN 0824795466, 43-66, 2000. The catalysts to produce LLDPE include Ziegler Natta catalysts, Phillips catalysts and single site catalysts. The latter class is a family of different classes of compounds, metallocene catalysts being one of them. As elucidated at pages 53-54 of said Handbook, a Ziegler-Natta, catalyzed polymer is obtained via the interaction of an organometallic compound or hydride of a Group 1-111 metal with a derivative of a Group IV-VIII transition metal. An example of a (modified) Ziegler-Natta catalyst is a catalyst based on titanium tetrachloride and the organometallic compound is triethylaluminium. A difference between metallocene catalysts and Ziegler Natta catalysts is the distribution of active sites. Ziegler Natta catalysts are heterogeneous and have multiple active sites. Consequently, polymers produced with these different catalysts will be different regarding for example the molecular weight distribution and the comonomer distribution.

Suitable technologies for the manufacture of LLDPE and LDPE include gas-phase fluidized-bed polymerization, polymerization in solution, polymerization in a polymer melt under very high ethylene pressure, and slurry polymerization, as known by the skilled person.

As used herein, with high density polyethylene is meant a polyethylene having a density in the range from 940 to 965 kg/m$^3$ as determined using ASTM D1505-10.

In the composition of the invention, the melt mass flow rate of the LLDPE or HDPE as determined using ASTM D 1238 measured at 190° C. under a load of 2.16 kg (190° C./2.16 kg) ranges from 4-125 g/10 min. For example, the melt mass flow rate of LLDPE is in the range from 4 to 10 g/10 min, for example in the range from 4 to 25 g/10 min, for example in the range from 4 to 50 g/10 min.

The melt flow index of the LLDPE or HDPE as determined using ASTM D-1238 (190° C./2.16 kg) may for example range between 10 g/10 min and 75 g/10 min, for example between 4 g/10 min and 50 g/10 min, for example between 20 g/10 min and 50 g/10 min. For example, the melt mass flow rate of HDPE is in the range from 4 to 10 g/10 min, for example in the range from 4 to 25 g/10 min, for example in the range from 4 to 50 g/10 min.

Preferably, the amount of LLDPE or HDPE in the composition of the invention is at least 80 wt %, for example at least 85 wt %, for example at least 90 wt %, for example at least 95 wt %, for example at least 97 wt %, for example at least 98 wt % based on the total composition.

With polypropylene as used herein is meant propylene homopolymer or a copolymer of propylene with an α-olefin, for example an α-olefin chosen from the group of α-olefin having 2 or 4 to 10 C-atoms, for example wherein the amount of α-olefin is less than 10 wt % based on the total propylene copolymer.

Polypropylene and a copolymer of propylene with an α-olefin can be made by any known polymerization technique as well as with any known polymerization catalyst system. Regarding the techniques, reference can be given to slurry, solution or gas phase polymerizations; regarding the catalyst system reference can be given to Ziegler-Natta, metallocene or single-site catalyst systems. All are, in themselves, known in the art.

Preferably, the polypropylene used in the invention, is a propylene homopolymer. More preferably, the melt temperature $T_m$ of the polypropylene as determined using DSC is from about 140 to 180, for example from about 150 to about 165° C., for example from about 155 to about 160° C. or the crystallization temperature $T_c$ of the polypropylene as determined using DSC is from about 100° C. to about 120° C., for example from about 105 to about 115° C., for example from about 110 to about 115° C. The melt temperature $T_m$ or the crystallization temperature $T_c$ can be measured using Differential Scanning Calorimetry according to ASTM D 3418-08 using a scan rate of 10° C./min on a sample of 10 mg and using the second heating cycle.

In a special embodiment, the melt temperature of the polypropylene is at least about 160° C. and for example at most about 200, for example at most about 180° C.

Preferably, in the composition of the invention, the degree of crystallinity of the polypropylene is at least 35%, for example at least 40% and for example at most 80%, for example at most 75% as determined using Differential Scanning Calorimetry according to ASTM D 3418-08 using a scan rate of 10° C./min on a sample of 10 mg and using the second heating cycle.

For example, the degree of crystallinity of the polypropylene is in the range from 30 to 55%, for example in the range from 35 to 50% as determined using Differential Scanning Calorimetry according to ASTM D 3418-08 using a scan rate of 10° C./min on a sample of 10 mg and using the second heating cycle.

The degree of branching from the polypropylene is preferably low, for example the branching index g' is at least 0.95, preferably at least 0.96, for example at least 0.97, for example at least 0.98, for example at least 0.99, for example 1.00

The branching index g' defines the degree or branching and correlates with the amount of branches of a polymer. The branching index g' is defined as $g'=[IV]_{br}/[IV]_{lin}$ in which g' is the branching index, $[IV]_{br}$ is the intrinsic viscosity of the branched polypropylene and $[IV]_{lin}$ is the intrinsic viscosity of the linear polypropylene having the same average molecular weight (within a range of ±3%) as the branched polypropylene. Thereby, a low g'-value is an indicator for a highly branched polymer. In other words, if the g'-value decreases, the branching of the polypropylene increases. Reference is made in this context to B. H. Zimm and W. H. Stockmeyer, J. Chem. Phys. 17, 1301 (1949). This document is hereby included by reference. The intrinsic viscosity needed for determining the branching index g' is measured according to DIN ISO 1628/1, October 1999 (in decalin at 135° C.).

Alternatively, the branching of the polypropylene may be measured using $^{13}C$ NMR. Preferably the amount of branching in the polypropylene is low, for example the amount of branching in the polypropylene is in the range from 0 to 10 branches/1000 carbon atoms, for example in the range from 0 to 5 branches/1000 carbon atoms for example in the range from 1 to 5 branches/1000 carbon atoms. Preferably, the melt mass flow rate of the polypropylene as determined using ASTM D1238-10 (230° C./2.16 kg) ranges from 0.3-100 g/10 min. Preferably, the melt mass flow rate of the polypropylene ranges from 1 to 25 g/10 min, more preferably from 2 to 12 g/10 min.

In the composition of the invention, the amount of polypropylene is from 0.005 to 10 wt % based on the total weight of the linear low density polyethylene or the high density polyethylene and the polypropylene in the composition.

Preferably, the amount of polypropylene in the composition is at least 0.01, for example at least 0.02, for example at least 0.03, for example at least 0.04, for example at least 0.05, for example at least 0.1, for example at least 0.2, for example at least 0.3, for example at least 0.4, for example at least 0.5, for example at least 0.7, for example at least 1, for example at least 2 and/or for example at most 8, for example at most 6, for example at most 5 wt % based on the total weight of the linear low density polyethylene and the polypropylene in the composition. Preferably, the amount of polypropylene in the composition is from about 0.01 to about 5 wt % based on the total weight of the linear low density polyethylene and the polypropylene.

Optionally, additives may be present in the composition of the present invention. The additives may for example be added prior to or during the melt-mixing of the LLDPE, or HDPE with the PP. Examples of suitable additives include but are not limited to the additives usually used for LLDPE or HDPE, for example antioxidants, acid scavengers, processing aids, lubricants, surfactants, blowing agents, ultraviolet light absorbers, quenchers, antistatic agents, slip agents, anti-blocking agents, antifogging agents, pigments, dyes and fillers, and cure agents such as peroxides. The additives may be present in the typically effective amounts well known in the art, such as 0.001 weight % to 10 weight % based on the total composition.

Therefore, the invention also relates to a composition of the invention further comprising additives.

The composition of the invention may be prepared by melt-mixing the linear low density polyethylene or the high density polyethylene with the polypropylene (PP).

Therefore, in another aspect, the invention also relates to a process for the preparation of the composition of the invention comprising the step of melt-mixing the linear low density polyethylene or the high density polyethylene with the polypropylene and the optional additives.

Before melt-mixing the linear low density polyethylene or the high density polyethylene, the polypropylene and the optional additives may be pre-mixed in a mixer, for example a dry blender (as may be purchased from Henschell). The polyethylene and the polypropylene are preferably pre-mixed or melt-mixed in the form of a powder or granules but, although less preferred may also be melt-mixed in the form of pellets.

After the melt-mixing, the composition obtained in the melt-mixing may be pelletized.

With melt-mixing is meant that the LLDPE or HDPE and the PP are mixed at a temperature that exceeds the Tm or Tc of the PP and of the LLDPE or HDPE. Melt-mixing may be done using techniques known to the skilled person, for example in an extruder, for example a single screw or twin screw extruder, preferably a twin screw extruder.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 180° C. in the feed zone to 300° C. at the die. Preferably, the temperature in the extruder varies from 165 to 250° C.; likewise, the screw speed of the extruder may be varied as needed. Typical screw speeds are in the range from about 100 rpm to about 400 rpm.

It has been found that the optical properties and in particular the clarity of the composition of the invention is improved as compared to an LLDPE or HDPE composition not containing polypropylene. For purpose of the invention, the clarity of the composition is measured according to ASTM D1746-09. Preferably, the clarity of the composition as measured according to ASTM D1746-09 is at least 10, for example at least 20, for example at least 30, for example at least 50, for example at least 60, for example at least 70, for example at least 80%, for example at least 90%.

One application of thin wall injection molding is thin wall packaging. Thin wall packaging produced via thin wall injection molding provides an answer to the desire for a more sustainable way of packaging, since less material and energy are needed for the injection molding. Consequently, thin wall packaging produced via thin wall injection molding reduces the carbon footprint of the packaging.

In another aspect, therefore, the invention relates to the use of the composition of the invention in injection molding, in particular to thin wall injection molding.

The most optimal conditions for (thin wall) injection molding depend on the exact composition used. In general, the temperature for injection molding will be around the $T_m$ or $T_c$ of the polypropylene in the composition of the invention, for example in the range from about 150 to about 200° C., for example in the range from about 150 to about 170° C., for example from about 155 to about 165° C. The optimal filling speed (generally less than 0.5 seconds for thin wall injection molding) and pressure with which the composition is injected into the mold, the time needed for cooling etc. can easily be determined by the person skilled in the art. For short cycle times, it is desired to keep the time that the composition is in the mold as short as possible.

The definition of thin wall is dynamic, since it depends upon the application for which it is used. Within the framework of this invention with 'thin wall' is meant a wall thickness in the range from 0.5 to 3.5, preferably 0.5 to 2 mm.

Examples of thin wall packaging items include but are not limited to: food packaging items, such as tubs, trays, jars, containers, lids, plates and cups Since the compositions of the invention may have a high heat distortion temperature as well as a low brittleness around freezing temperature, articles produced from said composition can be used at high as well as at lower temperatures.

Application areas where use at both higher and lower temperatures are desired are for example food applications, for example microwaveable, freezer-safe and ovenable containers and medical applications, where sterilization is needed prior to the filling of a container, but the medication inside the container needs to be stored at a low temperature (e.g. from 4 to 7° C.).

In another aspect, the invention relates to articles comprising the composition of the invention, wherein the article is prepared by injection molding, preferably thin wall injection molding.

In yet another aspect, the invention relates to a process comprising the step of injecting the composition of the invention in a mold, preferably a thin wall mold, wherein a thin wall mold is a mold providing a space having a wall thickness in the range from 0.5 to 2 mm.

Examples of thin wall injection molded objects include but are not limited to (food) packaging, cellular phone components, laptop/notebook computer components, hand held devices and medical devices, document cases, storage containers, pen barrels and packaging for textiles, for example for dry goods, socks, handkerchiefs, underwear etc.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention is now elucidated by way of the following examples, without however being limited thereto.

EXAMPLES 1-12

The LLDPE granules, polypropylene granules and the additives (primary antioxidant Irganox1076 and zinc stearate as acid scavenger) were added in a Henschel mixer (dry blender) and then mixed and pelletized in a co-rotating twin screw extruder (ZSK30) with kneading blocks at a melt temperature of about 200° C. The screw speed of the twin screw extruder was about 200 rpm and the feed rate was about 30 kg/hr.

The amounts of polypropylene were varied from 0 to 3 wt % based on the LLDPE and PP used. Table 1 summarizes the ingredients of the different compositions that were prepared.

TABLE 1

Compositions used in the examples

| Composition name | LLDPE used | PP[3] (wt %) |
|---|---|---|
| Comparative A1 | Sabic ®-LLDPE M500026[1] | 0 |
| Example 1 | Sabic ®-LLDPE M500026 | 3 |
| Comparative A2 | Sabic ®-LLDPE M500026[1] | 0 |
| Example 2 | Sabic ®-LLDPE M500026[1] | 0.01 |
| Example 3 | Sabic ®-LLDPE M500026[1] | 0.5 |
| Example 4 | Sabic ®-LLDPE M500026[1] | 1 |
| Comparative A3 | Sabic ®-LLDPE M500026[1] | 0 |
| Example 5 | Sabic ®-LLDPE M500026[1] | 1.0 |
| Example 6 | Sabic ®-LLDPE M500026[1] | 2.0 |
| Example 7 | Sabic ®-LLDPE M500026[1] | 3.0 |
| Comparative B | Sabic ®-LLDPE-M200024[2] | 0 |
| Example 8 | Sabic ®-LLDPE-M200024 | 0.01 |
| Example 9 | Sabic ®-LLDPE-M200024 | 0.5 |
| Example 10 | Sabic ®-LLDPE-M200024 | 1.0 |
| Example 11 | Sabic ®-LLDPE-M200024 | 2.0 |
| Example 12 | Sabic ®-LLDPE M200024 | 3.0 |

[1]Sabic ®-LLDPE M500026 is a linear low density injection molding grade having a melt mass flow rate of 50 g/10 min as determined using ASTM D1238-10 (190° C./2.16 kg) and a density of 926 kg/m³ as measured using ASTM D1505-10 obtained from Saudi Basic Industries Corporation.
[2]Sabic ®-LLDPE M200024 is a linear low density injection molding grade having a melt mass flow rate of 20 g/10 min as determined using ASTM D1238-10 (190° C./2.16 kg) and a density of 924 kg/m³ as measured using ASTM D1505-10 obtained from Saudi Basic Industries Corporation.
[3]The polypropylene homopolymer used was Sabic ® PP500P, which had a Tc of 110° C., a Tm of 162° C., a degree of crystallinity of 40% and a melt mass flow rate of 3.0 g/10 min as determined using ASTM D1238-10 (230° C./2.16 kg). Sabic ®-PP500P does not contain a nucleating agent. SABIC ®-PP500P does not contain any chain branching. Its chain branching index g' is therefore >0.98 and the amount of branches per 1000 carbon atoms is less than 1 branch/1000 carbon atoms.

The following parameters were measured:

The crystallization temperature ($T_c$) was measured according to ASTM D3418-08 as indicated herein.

The melt temperature ($T_m$) of the second heating curve conducted on two samples was also recorded (average $2^{nd}$ heat).

The heat of fusion ($\Delta Hf$) was measured according to ASTM D3418-08.

The degree of crystallinity (Xc2) was measured according to ASTM D3418-08.

The hardness was measured according to ASTM D2240-05(2010).

The gloss was measured according to ASTM D2457-08e1 at a 45° angle.

The haze was measured according to ASTM D1003-11e1.

The heat distortion temperature (HDT) was determined using ASTM method D648-07 at 0.455 MPa on a 3.2 mm sample, wherein the temperature is increased at 2° C./min until the sample deflects 0.25 mm.

The Vicat softening point (Vicat), which is also known as Vicat hardness is the determination of the softening point for materials that have no definite melting point, such as plastics.

The Vicat softening point was as determined using ASTM D 1525-09 using a 1 mm² needle having a circular cross-section and a load of 10N wherein the temperature is increased at 2° C./min until the needle penetration reaches 1 mm.

The transmittance was measured according to ASTM D1746-09.

The haze was measured according to ASTM D1003-11e1.

The clarity was measured according to ASTM D1746-09.

The obtained compositions were injection molded at a temperature of around 160° C. to obtain dog bones, flexural, Izod bars and rectangular plaques of 3.2 mm thickness.

The mechanical properties were measured on dog bones and bars of 3.2 mm thickness according to ASTM D638-10.

The tensile properties were measured at a tensile testing speed of 50 mm/min with a gauge length of 115 mm (unless otherwise indicated). The flexural properties were measured using a span of 54.4 mm and a testing speed of 1.4 mm/min.

The properties measured were: the flexural secant modulus (Ef-sec in MPa), and the tensile secant modulus (E-sec in MPa) as well as the tensile stress at yield σy (MPa), the tensile strain at yield $\epsilon$ y (%), the tensile stress at break σb (MPa) and the tensile strain at break $\epsilon$ b (%).

The results of the measurements for comparative example A and example 1 are indicated in tables 2 and 3 (mechanical properties) below.

TABLE 2

|  | Comparative A LLDPE MFI 50 with 0 wt % PP | Example 1- LLDPE MFI 50 with 3 wt % PP |
|---|---|---|
| Tc (° C.) | 107.6 | 108 |
| Xc2 (%) | 54 | 49.15 |
| Tmelt (Average $2^{nd}$ heat) (° C.) | 123 | 122.5 |
| Hardness | 50.16 | 52 |
| Clarity | 3.44 | 36.98 |
| Gloss | 51.18 | 45.84 |
| Haze | 53.86 | 53.58 |
| HDT (° C.) | 44.07 | 47 |
| Vicat (° C.) | 90.93 | 93.17 |

As can be seen from Table 2 above, addition of 3 wt % polypropylene to LLDPE leads to an increase in HDT and/or Vicat, which means that when this composition is used in (thin wall) injection molding, the cycle time may be reduced. The addition of 3 wt % PP to the LLDPE also leads to a 10 fold increase in clarity. Furthermore, the degree of crystallinity is slightly decreased by the addition of 3 wt % PP to the LLDPE. The addition of 3 wt % PP to the LLDPE does not significantly affect the other properties that were measured.

Therefore, with the compositions of the invention optical properties of LLDPE and in particular clarity is increased. Furthermore, the compositions of the invention are excellently suitable for use in (thin wall) injection molding applications, since due to increase in Vicat and/or HDT, cycle times may be reduced. All of this is achieved by the invention without significantly affecting other properties, such as those that are measured.

TABLE 3

Mechanical properties

|  | Comparative A1 LLDPE MFI 50 with 0 wt % PP | Example 1 LLDPE MFI 50 with 3 wt % PP |
|---|---|---|
| Flexural | | |
| Ef-Sec | 268 MPa | 335 MPa |
| Tensile | | |
| E-Sec (MPa) | 437 | 548 |
| σy (MPa) | 11.9 | 13.56 |
| $\epsilon$ y (%) | 14 | 9.7 |
| σb (MPa) | 8.52 | 12 |
| $\epsilon$ b (%) | 250 | 40 |

As can be seen from Table 3 above, the mechanical properties of the LLDPE composition of the invention also benefit from the addition of 3 wt % PP. An increase in tensile and flexural secant modulus of 20% is observed. Further, there is an increase in stress at yield and stress at break accompanied by a decrease in the strain at yield and strain at break.

Therefore, with the compositions of the invention, also improved mechanical properties may be obtained.

Example 1 was repeated but with a different batch of LLDPE-M500026 and with 0, 0.01, 0.5 and 1 wt % of the same PP. The properties were measured as indicated herein. 3.2 mm or 2 mm plaques were used for clarity measurement. The results are presented in Table 4 below.

TABLE 4

Mechanical properties of LLDPE-M500026 and with 0, 0.01, 0.5 and 1 wt % PP in granular form

| | Example # | | | |
|---|---|---|---|---|
| | Comparative A2 | 2 | 3 | 4 |
| PP (wt %) | 0 | 0.01 | 0.5 | 1 |
| Tensile | | | | |
| Tensile testing speed of 50 mm/min and a gauge length of 115 mm | | | | |
| σy (MPa) | 13.12 | 13.09 | 13.05 | 13.19 |
| σb (MPa) | 9.0 | 11.22 | 9.54 | 9.76 |
| $\epsilon$ y (%) | 13.28 | 10.91 | 11.91 | 11.86 |
| $\epsilon$ b (%) | 170 | 47 | 114 | 114 |
| E-sec | 504 | 463 | 493 | 488 |
| Tensile testing speed of 5 mm/min and a gauge length of 50 mm/min | | | | |
| Vicat (10 N/120° C./hr) | 92.53 | 95.73 | 92.67 | 93.03 |
| HDT(455 KPa-120° C./hr) | 47.30 | 49.70 | 50.77 | 50.13 |
| Clarity (%) 3.2 mm plaques | 3.32 | 24.24 | 70.78 | 67.28 |
| Clarity (%) 2 mm plaques | 6.94 | 78 | 86 | 86 |
| Gloss 45 | 52.96 | 56.32 | 49.38 | 43.72 |
| Flexural | | | | |
| Span: 50 mm; Speed: 1.3 mm/min | | | | |
| Flexural Stress (MPa) | 9.75 | 10.01 | 10.24 | 10.66 |
| Ef-Sec (MPa) | 397 | 414 | 436 | 455 |
| Tc (° C.) | 108.1 | 107.6 | 107.2 | 107.5 |
| Tm ($2^{nd}$ heat) (° C.) | 123.1 | 121.5 | 121.5 | 121.5 |
| Xc (%) | 49.50 | 49.47 | 49.3 | 47.58 |

As can be seen from Table 4 above, addition of polypropylene to LLDPE leads to an increase in HDT and/or Vicat, which means that when the compositions of the invention are used in (thin wall) injection molding, the cycle time may be reduced. The addition of polypropylene may also increase the clarity of the compositions of the invention as is the case for examples 2, 3 and 4 according to the invention.

Example 1 was repeated but with again a different batch of LLDPE-M500026 and with 0, 1, 2 and 3 wt % of the same PP. The properties were measured as indicated herein. 3.2 mm plaques were used for clarity measurement. The results are presented in Table 5 below.

TABLE 5

Properties LLDPE500026 with 1-2-3 wt % PP in granular form.

| | Example # | | | |
|---|---|---|---|---|
| | Comparative A3 | 5 | 6 | 7 |
| PP (wt %) | 0 | 1.0 | 2.0 | 3.0 |
| Tensile | | | | |
| Testing speed of 50 mm/min Gauge length of 115 mm | | | | |
| σy (MPa) | 12.88 | 13.68 | 13.84 | 13.83 |
| σb (MPa) | 8.04 | 8.06 | 8.48 | 8.05 |
| $\epsilon$ y (%) | 14.94 | 11.76 | 11.93 | 11.42 |

TABLE 5-continued

Properties LLDPE500026 with 1-2-3 wt % PP in granular form.

| | Comparative A3 | 5 | 6 | 7 |
|---|---|---|---|---|
| ∈ b (%) | 319 | 53 | 60 | 44 |
| E-sec](MPa) | 352 | 393 | 452 | 410 |
| Testing speed of 5 mm/min | | | | |
| Gauge length of 50 mm/min | | | | |
| Vicat (° C.)-(10 N/120° C./hr) | 89.40 | 91.20 | 89.50 | 89.97 |
| HDT(° C.)-(455 KPa-120° C./hr) | 56.53 | 59.40 | 57.80 | 57.80 |
| Clarity (%) 3.2 mm plaques | 3.46 | 79.52 | 87.2 | 63.80 |
| Gloss45 (%) | 50.0 | 53.16 | 50.52 | 47.22 |
| Flexural | | | | |
| Span: 50 mm; | | | | |
| Speed: 1.3 mm/min | | | | |
| Flexural Stress (MPa) | 12.65 | 14.19 | 14.55 | 14.76 |
| Flexural Secant modulus (MPa) | 480 | 606 | 595 | 627 |
| Tc (° C.) | 107.8 | 108.8 | 108.7 | 109.1 |
| Tm ($2^{nd}$ heat) (° C.) | 121.7 | 121.0 | 121.5 | 121.0 |
| Xc (%) | 54% | 52% | 48% | 52% |

As can be seen from Table 5 above, the presence of PP in the compositions of the invention may increase increases the clarity as is shown by examples 5, 6 and 7.

Example 1 was repeated with an LLDPE having a different melt flow index.

The results of the measurements for comparative example B and examples 8-12 are indicated in Table 6 below.

The addition of polypropylene to LLDPE leads to an increase in HDT and/or Vicat, which means that when this composition is used in (thin wall) injection molding, the cycle time may be reduced.

Further, there is an increase in stress at yield, a decrease in the stress at break accompanied by a decrease in the strain at yield and strain at break.

Therefore, with the compositions of the invention, the clarity is increased. Furthermore, the compositions of the invention are excellently suitable for use in (thin wall) injection molding applications, since due to increase in Vicat and/or HDT, cycle times may be reduced. All of this is achieved by the invention without significantly affecting other properties, such as those that are measured.

Therefore, with the compositions of the invention, also improved mechanical properties may be obtained.

EXAMPLES 13-15

Example 1 was repeated but instead of granules of LLDPE, pellets of Sabic®-HDPE M3000054 were melt-mixed with different amounts of Sabic® PP500P in pellet form (0; 0.5; 1 or 3 wt % based on the total composition). Sabic®-HDPE M3000054 is a high density injection molding grade having a melt mass flow rate of 30 g/10 min as determined using ASTM D1238-10 (190° C./2.16 kg) and a density of 954 kg/m³ as measured using ASTM D1505-10 and was obtained from Saudi Basic Industries Corporation. Sabic® PP500P is a polypropylene homopolymer with a Tc of 110° C. and a melt mass flow rate of 3.0 g/10 min as determined using

TABLE 6

| | Comp. example B | 8 | 9 | 10 | 11 | 12 |
|---|---|---|---|---|---|---|
| Amount of PP (wt %) | 0 | 0.01 | 0.5 | 1.0 | 2.0 | 3.0 |
| Tensile | | | | | | |
| (tensile testing speed of 50 mm/min and a gauge length of 115 mm) | | | | | | |
| σy (MPa) | 10.28 | 11.30 | 11.49 | 11.76 | 12.57 | 12.30 |
| σb (MPa) | 12.5 | 9.50 | 9.4 | 9.98 | 10.54 | 9.65 |
| ∈ y (%) | 48 | 16.13 | 15.5 | 13.76 | 13.1 | 13.76 |
| ∈ b (%) | >1000 | ~500 | ~500 | 740 | 800 | 630 |
| E-Sec (MPa) | 282.54 | 220 | 216 | 338 | 344.76 | 358.88 |
| (tensile testing speed of 5 mm/min and a gauge length of 50 mm) | | | | | | |
| Vicat (10 N/120° C./hr) | 95.57 | 98 | 97.57 | 96.50 | 95.57 | 96.24 |
| HDT(455 kPa/120° C./hr) | 42.60 | 50.67 | 52.60 | 45.67 | 46.27 | 48.67 |
| Clarity | 6.42 | 79.18 | 86.7 | 85.4 | 73.58 | 49.16 |
| Gloss45 | 39.58 | 49.72 | 50.32 | 45.96 | 39.20 | 29.98 |
| Flexural | | | | | | |
| Span 54.4 mm; 1.4 mm/min | | | | | | |
| Flexural stress (MPa) | 7.94 | 8.63 | 8.75 | 8.94 | 9.10 | 9.31 |
| Flexural secant Modulus Ef-Sec (MPa) | 311 | 338 | 380 | 367 | 367 | 387 |
| Tc | 107.4 | 107.0 | 107.9 | 107.3 | 106.8 | 107 |
| Tm ($2^{nd}$ heat) | 122.5 | 122.2 | 121.43 | 122.15 | 122.20 | 122.30 |
| Xc ($2^{nd}$ Run) | 46 | 43.61 | 43.36 | 47 | 43.48 | 42.01 |

As can be seen from Table 6, the addition of PP to the LLDPE significantly enhances the clarity of the LLDPE.

ASTM D1238-10 (230° C./2.16 kg). Sabic®-PP500P does not contain a nucleating agent.

The obtained HDPE/PP compositions were injection molded at a temperature of around 160° C. The clarity was measured on samples of 3.2 mm thickness according to ASTM D1746-09.

The results are presented in table 7 below.

TABLE 7

| Example number | Formulation | Clarity (%) |
|---|---|---|
| Comparative example C | HDPE M300054 | 3.5 |
| Example 17 | HDPE M300054 + 0.5 wt % PP | 41 |
| Example 14 | HDPE M300054 + 1.0 wt % PP | 36 |
| Example 15 | HDPE M300054 + 3.0 wt % PP | 43 |

As can be seen from Table 7, the clarity of HDPE is also significantly increased in the compositions of the present invention by the presence of PP.

EXAMPLES 16 AND 17

Examples 13-15 were repeated with different amounts of PP (0 ppm; 500 ppm=0.05 wt %; 1000 ppm=0.1 wt %). The results are shown in Table 8 below

TABLE 8

| | Example # | | |
|---|---|---|---|
| | Comp. Example D HDPE-300043 | Example 16 HDPE-300043 | Example 17 HDPE-300043 |
| Amount of PP (ppm) | 0 | 500 | 1000 |
| Tensile (tensile testing speed of 50 mm/min and a gauge length of 115 mm) | | | |
| σy (MPa) | 25 | 26 | 26 |
| σb (MPa) | 12.5 | 12.5 | 12.6 |
| Є y (%) | 9.9 | 9.4 | 9.3 |
| Є b (%) | 181 | 180 | 109 |
| E-Sec (Mpa) | 1059 | 973 | 1226 |
| Tensile testing speed of 5 mm/min and a gauge length of 50 mm. | | | |
| HDT (455 kPa/120° C./h) | 74 | 72 | 77 |
| Vicat (10 N/120° C./h) | 124 | 123 | 124 |
| Clarity (%) | 3.8 | 18.2 | 54.8 |
| Gloss45-(%) | 52.7 | 55.0 | 51.1 |
| Haze (%) | 105 | 104 | 104 |
| Flexural-Span-50 mm-1.3 mm/min | | | |
| σF (flexural stress) (MPa) | 23 | 24 | 24 |
| Flexural secant modulus Ef (MPa) | 891 | 891 | 879 |
| Tc-(%) | 116 | 115 | 115 |
| Tm (2$^{nd}$ heat) | 129.4 | 129.6 | 129.2 |
| Xc (2$^{nd}$ Run) | 69 | 70.4 | 70 |

As can be seen from Table 8, the addition of small amounts of PP to HDPE significantly enhances the clarity of the HDPE, while other (mechanical) properties are maintained.

EXAMPLES 18 AND 19

HDPE-200056

Example 1 was repeated but instead of granules of LLDPE, powder of Sabic®-HDPE M200056 were melt-mixed with different amounts of Sabic® PP500P in powder form (0; 0.5; 1 wt % based on the total composition). Sabic®-HDPE M2000056 is a high density injection molding grade having a melt mass flow rate of 20 g/10 min as determined using ASTM D1238-10 (190° C./2.16 kg) and a density of 956 kg/m$^3$ as measured using ASTM D1505-10 and was obtained from Saudi Basic Industries Corporation.

The results of these experiments are given in table 9 below.

TABLE 9

| | Example # | | |
|---|---|---|---|
| | Comp. Ex. E | 18 | 19 |
| HDPE type | HDPE-200056-Powder | HDPE-200056-Powder | HDPE-200056-Powder |
| PP (wt %) | 0 | 0.5 wt % | 1 wt % |
| Clarity-2 mm thick | 23.4 ± 1.47 | 76.68 ± 1.52 | 68.56 ± 0.28 |
| Gloss 45-2 mm | 42.84 ± 0.83 | 47.06 ± 0.42 | 44.92 ± 0.77 |
| Haze-2 mm | 104 | 103 | 104 |

As can be seen from Table 9, the clarity of HDPE is also significantly increased in the compositions of the invention by the presence of PP.

The invention claimed is:

1. A process comprising:
preparing a composition comprising:
linear low density polyethylene having a melt mass flow rate as determined using ASTM D-1238 (190° C./2.16 kg) in the range from 4 to 125 g/10 min or high density polyethylene having a melt mass flow rate as determined using ASTM D-1238 (190° C./2.16 kg) in the range from 4 to 125 g/10 min;
polypropylene, wherein the amount of polypropylene is from 0.005 to 10 wt % based on the total weight of the linear low density polyethylene or the high density polyethylene and the polypropylene, wherein the polypropylene has a melt temperature ($T_m$) from 140° C. to 200° C. and/or a crystallization temperature ($T_c$) from 100° C. to 140° C., wherein the $T_m$ and $T_c$ are determined using Differential Scanning calorimetry according to ASTM D 3418-08 using a scan rate of 10° C./min on a sample of 10 mg and using the second heating cycle; and
less than 0.1 ppm nucleating agent
injecting the composition into a thin wall injection mold;
molding the composition into an article, wherein the temperature of injection molding is about 155° C. to about 165° C.; and
removing the article from the thin wall injection mold.

2. The process according to claim 1, wherein the degree of crystallinity of the polypropylene is at least 35% as determined using Differential Scanning calorimetry according to ASTM D 3418-08 using a scan rate of 10° C./min on a sample of 10 mg and using the second heating cycle.

3. The process according to claim 1, wherein the composition comprises less than 0.01 ppm of nucleating or clarifying agents from the group of benzoic acid salts, substituted benzoic acid salts, dicarboxylate metal salts, hexahydrophthalic acid metal salts, phosphate ester salts, glycerolate salts, diamides, triamides, tetramides, pine rosin derivatives, di-acetal derivatives, 2,6-naphthalene dicarboxamides, polyvinylcyclohexanes, talc, pigments and combinations thereof.

4. The process according to claim 1, wherein the melt mass flow rate of the polypropylene as determined using ASTM D1238-10 (230° C./2.16 kg) ranges from 0.3 to 100 g/10 min.

5. The process according to claim 1, wherein the amount of polypropylene is from about 0.01 to 5 wt % based on the total weight of the linear low density polyethylene or the high density polyethylene and the polypropylene.

6. The process according to claim 1, wherein the clarity of the composition as measured according to ASTM D1746 is at least 30%.

7. The process according to claim 1, wherein the composition further comprises an additive.

8. The process according to claim 1,
wherein the degree of crystallinity of the polypropylene is at least 35% as determined using Differential Scanning calorimetry according to ASTM D 3418-08 using a scan rate of 10° C./min on a sample of 10 mg and using the second heating cycle;
wherein the composition comprises less than 0.01 ppm of nucleating or clarifying agents from the group of benzoic acid salts, substituted benzoic acid salts, dicarboxylate metal salts, hexahydrophthalic acid metal salts, phosphate ester salts, glycerolate salts, diamides, triamides, tetramides, pine rosin derivatives, di-acetal derivatives, 2,6-naphthalene dicarboxamides, polyvinylcyclohexanes, talc, pigments, and combinations thereof; and
wherein the amount of polypropylene is from about 0.01 to 5 wt % based on the total weight of the linear low density polyethylene or the high density polyethylene and the polypropylene.

9. The process according to claim 8, wherein the melt mass flow rate of the polypropylene as determined using ASTM D1238-10 (230° C./2.16 kg) ranges from 0.3 to 100 g/10 min.

10. The process according to claim 9, wherein the clarity of the composition as measured according to ASTM D1746 is at least 30%.

11. A process comprising:
preparing a composition consisting essentially of:
linear low density polyethylene having a melt mass flow rate as determined using ASTM D-1238 (190° C./2.16 kg) in the range from 4 to 125 g/10 min or high density polyethylene having a melt mass flow rate as determined using ASTM D-1238 (190° C./2.16 kg) in the range from 4 to 125 g/10 min; and
polypropylene, wherein the amount of polypropylene is from 0.005 to 10 wt % based on the total weight of the linear low density polyethylene or the high density polyethylene and the polypropylene, wherein the polypropylene has a melt temperature ($T_m$) from 140° C. to 200° C. and/or a crystallization temperature ($T_c$) from 100° C. to 140° C., wherein the $T_m$ and $T_c$ are determined using Differential Scanning calorimetry according to ASTM D 3418-08 using a scan rate of 10° C./min on a sample of 10 mg and using the second heating cycle;
wherein the composition contains less than 0.01 ppm of a nucleating or clarifying agent;
injecting the composition into a thin wall injection mold;
molding the composition into an article, wherein the temperature of injection molding is about 155° C. to about 165° C.; and
removing the article from the thin wall injection mold.

12. An article formed by the process of claim 11.

13. The process according to claim 1, wherein the thin wall injection mold provides a space having a wall thickness in the range from 0.5 to 2 mm.

14. An article formed by the process of claim 1.

* * * * *